United States Patent [19]

Montgomery et al.

[11] 3,892,781
[45] July 1, 1975

[54] METHOD FOR OXIDIZING O-XYLENE TO PHTHALIC ANHYDRIDE

[75] Inventors: Stewart R. Montgomery, Ashton; Thomas H. Cheavens, Glenwood, both of Md.

[73] Assignee: W. R. Grace & Co., New York, N.Y.

[22] Filed: Aug. 2, 1973

[21] Appl. No.: 384,864

[52] U.S. Cl. ............................................. 260/346.4
[51] Int. Cl.² ...................................... C07D 307/89
[58] Field of Search ................................. 260/346.4

[56] References Cited
FOREIGN PATENTS OR APPLICATIONS
2,005,969  8/1971  Germany

OTHER PUBLICATIONS

Filipov et al.; Chem. Abstracts, Vol. 74 (1971), 42181t; Abstract of U.S.S.R. 278,677, Aug. 21, 1970.

*Primary Examiner*—Henry R. Jiles
*Assistant Examiner*—Bernard I. Dentz
*Attorney, Agent, or Firm*—Joseph P. Nigon, Esq.

[57] ABSTRACT

There is provided a novel process for improving the yield of phthalic anhydride recovered from the oxidation of o-xylene by carrying out the reaction in a fluidized bed reactor system wherein the reactants are passed through two or more separate catalytic reactors in sequence.

3 Claims, 1 Drawing Figure

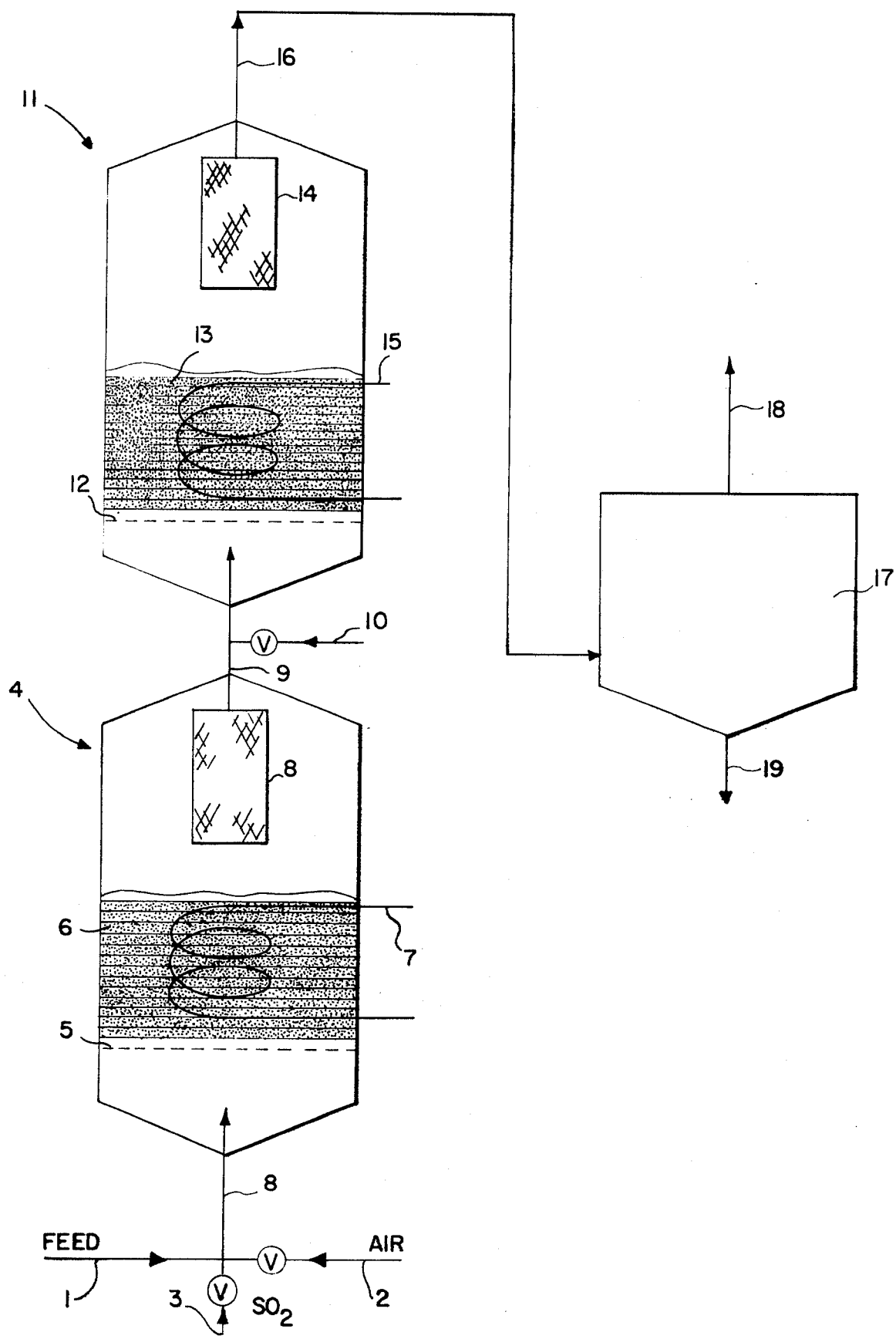

METHOD FOR OXIDIZING O-XYLENE TO PHTHALIC ANHYDRIDE

BACKGROUND OF THE INVENTION

Phthalic anhydride is produced in conventional fluid bed reactors by reacting a charge material with oxygen in the presence of a suitable catalyst. The charge material consists of naphthalene or ortho-xylene, and the catalyst consists of a suitable oxide from Group VB and VI B of the periodic system, with Vanadium being the most preferable element. The phthalic anhydride reaction occurs under favorable conditions when an excess of oxygen is introduced into the reaction zone. Accordingly, phthalic anhydride is produced when quantities of oxygen are introduced into the reactor in excess of the quantities which are required by the oxidation reactions represented by the formula:

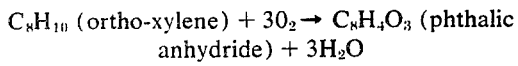

$C_8H_{10}$ (ortho-xylene) $+ 3O_2 \rightarrow C_8H_4O_3$ (phthalic anhydride) $+ 3H_2O$ However, in catalytic vapor phase oxidations, it has been found that notwithstanding the use of an active catalyst it is necessary to exercise the most rigid control over reaction conditions, particularly the catalyst temperature and contact time, in order to obtain oxidation of the aromatic feedstock to the desired product without over oxidation ultimately to carbon oxides and water or without the production of less desirable by-products.

This over oxidation is favored by extended contact of the product with the catalyst and by high concentrations of oxygen in the reactor. In a fixed bed catalytic oxidation process the contact times of the hydrocarbon-oxygen mixtures with the catalyst bed are quite short, usually less than 1 second. But in most fluid bed oxidation processes contact times of 12–20 seconds are required to properly fluidize the catalyst bed.

A further complication unique to fluidized bed catalytic systems also results in prolonged contact of the oxidation product with the catalyst. It has been known for some time that the flow patterns in a fluidized bed are such as to cause the vapors and catalyst present at the exit portion of the bed to be "back-mixed" with those present at the inlet zone. Thus, part of the desired product is always being recirculated back through the turbulent catalyst to be over-oxidized into less desirable by-products. There is also the transport of vapors through the bed in the form of bubbles devoid of catalyst. The bubbles contain unreacted o-xylene and result in a lower conversion factor. Several methods are known for minimizing the effect of these undesirable characteristics of fluid bed oxidation systems. These involve staging with perforated plates or grids and filling the reactor with solid or hollow spheres or other types of packing. None of these methods completely eliminate catalyst back-mixing since each catalyst bed or section is not completely isolated from another. The prior art one stage single-pass reactors are also limited to a fairly narrow range of process conditions such as o-xylene/air ratio during oxidation, contact time, temperature, etc.

In summary, this invention provides a means of producing phthalic anhydride in good yield from o-xylene in a fluidized catalyst oxidation system wherein the reactants are passed through two or more separate catalyst sections in sequence.

It is an object of this invention to provide a process for improving the yield of phthalic anhydride from the oxidation of o-xylene by about 10 to 15 percent, and at the same time improve conversion so that nearly all of the feed is consumed per pass through the reactor system.

It is a further object of this invention to provide a multi-stage fluid bed reactor process for oxidizing o-xylene to phthalic anhydride wherein, contact time, temperatures and feed concentrations may be varied between the separate stages to improve yields.

A still further object of this invention to provide a novel fluid bed catalyst reactor process wherein there is no intermixing of catalysts from one stage to another.

These and other objects and advantages which are mentioned in or rendered obvious by the following detailed specification are achieved by passing the reactants in this case o-xylene and air, through two or more separate fluid bed catalyst ($V_2O_5/TiO_2$) stages in sequence, the effluent gases of the first stage becoming the feed to the second stage and so forth.

The FIGURE, is a diagrammatic drawing illustrating one suitable type of apparatus for carrying out the method of the present invention and also is effective as a flow sheet to show the flow of materials.

Referring now to the FIGURE, air 2 compressed and preheated to a temperature of from 300° to 400°F, a promoter in the form of sulfur dioxide 3 in 0.1 percent molar concentration, and ortho-xylene 1 of commercial purity are mixed in a mutual confluence zone 8 in the air/o-xylene weight ratios of from 6.5 to 20, and introduced into the bottom of a first stage reactor 4 containing a bed of catalyst 6 supported by a grid 5. The catalyst bed 6 has a height of 10 inches and a diameter of 0.75 inch. In this preferred embodiment the equilibrium catalyst (the catalyst after it has reached equilibrium conditions) has the following composition by weight:

|        | Percent |
|--------|---------|
| $V_2O_5$ | 2.7 |
| $Sb_2O_3$ | 4.0 |
| $K_2S_2O_7$ | 15.5 |
| $Cs_2S_2O_7$ | 7.5 |
| $TiO_2$ | 70.3 |

The support ($TiO_2$) was a microspheroidal anatase produced by calcining spray dried titania gel. Normally, the catalyst had a surface area of 6–9 m$^2$/g., a pore volume of 0.1–0.2 cc/g. and an average particle size of 65–85 microns. The process of this invention seems to be uniquely suited to the oxidation of o-xylene to phthalic anhydride with a $V_2O_5$-$TiO_2$ catalyst. It does not give satisfactory yields of phthalic anhydride from naphthalene with a $V_2O_5$-$SiO_2$ catalyst.

A plurality of cooling coils 7 are immersed in the catalyst bed 6 which is fluidized by the mixed gas stream. The heat of reaction is removed by generating steam in the cooling coils 7, and is removed at such a rate that the temperature in the reactor is maintained at about 695°F.

The gaseous reaction effluent is withdrawn from the top of the first stage reactor through a system for filtering of entrained catalyst particles 8, at a rate such that the pressure at the top of the reactor is from ambient to 20 p.s.i.g. The separated catalyst is recirculated by air back to the reactor. The filtered effluent gases exit the reactor at line 9 and can at this point be optionally mixed with additional air from line 10 to increase the air-feed ratio. The filtered effluent gases from the first stage reactor are now introduced into a similar second stage reactor 11 containing a catalyst bed 13, grid 12, cooling coils 15, and filter 14. In this second stage reactor various process conditions may be adjusted to improve the yield of phthalic anhydride. The catalyst bed volume may be decreased to decrease contact time or the temperature may be lowered in order to favor one type of oxidation.

The effluent gases from the second stage reactor exit the system at line 16 and may be conveyed to further similar reactor stages in series or can be routed to a product collecting system 17, which usually comprises a liquid condenser, a quench vessel, and solids recovery equipment. The condenser serves to cool the gaseous effluent to a temperature of about 270°F and at this temperature about 90 percent of the product phthalic anhydride in the reactor effluent condenses out as a liquid. This liquid is withdrawn through a heated line 19 to a pressure tank (not shown) which is heated to maintain the phthalic anhydride at a temperature of about 290°F.

After all the phthalic anhydride is recovered in the product collector system 17 the remaining uncondensed gases exit at line 18.

It is to be appreciated that the foregoing description pertains to a preferred set of operating conditions for carrying out the process of the present invention, and that the operating conditions may be varied within limitations without adversely effecting the yield and selectivity of oxidation. In practice it has been determined that the sulfur dioxide promoter may vary from about 0.01 to about 5 percent preferably 0.05 to 2 percent, based on the weight of o-xylene.

The ratio of air to o-xylene in the first stage reactor may range from as low as about 6.5 : 1 to as high as about 20 : 1; however, preferably it is between about 8:1 and 15:1 as mentioned above. The air to o-xylene ratio in the second stage reactor is preferably 8 : 1 to 15 : 1 and may be adjusted to this value by the addition of air between stages.

The air feed preferably is introduced to the first stage reactor at a pressure of about 25 to 35 p.s.i.g., and the reactor is preferably maintained at a pressure of 20 to 30 p.s.i.g. In the case of the second reactor the feed gases are introduced at a pressure of 25 to 35 p.s.i.g. and the second stage is operated at a pressure equal to or slightly below that of the first reactor.

The operating temperatures also may vary. Overall broad limits for the reactor temperature are about 600°F as a minimum and about 775°F as a maximum. A preferred range is about 675° to 725°F.

As a general consideration it is preferred that in a full scale plant the reactor vessels have fluid beds with a height of 15 to 25 feet and diameters in the range of 20 to 25 feet. For optimum performance the fluid velocity through the reactors should be in the order of 1.5 to 2.5 feet, per second.

The following examples will further illustrate the invention without limiting it. All tests were performed on laboratory bench scale apparatus.

EXAMPLE 1

Each stage of a stainless steel two-stage reactor with an internal diameter of 0.75 inch (both stages) was charged with 53 grams of a microspheroidal $V_2O_5/TiO_2$ oxidation catalyst (2.7 percent by wt. $V_2O_5$, 70.3 percent by wt. $TiO_2$) having a surface area of 8.3 $m^2/g$ and an average particle size of 72 microns. The reactor was heated to temperature and gaseous mixtures of vaporized commercial o-xylene (o-xylene assay 96 wt%), sulfur dioxide and air were passed through the reactor under the conditions shown in Table I. The vapors discharged from the second stage were analyzed by gas chromatography. The yields of phthalic anhydride and maleic anhydride and the percentage of o-xylene consumed during a 29 hour test are shown in Table I.

EXAMPLE 2

A single-stage stainless steel fluid bed reaction (internal diameter = 0.75 inch) was charged with 106 grams of another sample of the catalyst used in Example 1 and tested for 27 hours under essentially the same conditions. In this case lower yields of phthalic anhydride were obtained as shown in Table II.

A comparison of the results shown in Tables I and II shows the marked improvement in feed conversion brought about by the use of a two-stage system. There is also an accompanying increase in product selectivity evidenced by the smaller yields of maleic anhydride in the two stage system.

EXAMPLE 3

The two-stage reactor was charged with a total of 106 grams (53 grams each stage) of a $V_2O_5/TiO_2$ oxidation catalyst which had a surface area of 8 $M^2/g$ and an average particle size of 85 microns. The results obtained during a 50 hours test are shown in Table III.

EXAMPLE 4

The catalyst used in Example 3 was placed in the single-stage fluid bed test reactor and run for 29 hours under essentially identical conditions as Example 3. Again the yields of phthalic anhydride were lower than those obtained with the two-stage reactor as shown in Table IV.

EXAMPLE 5

This example compares one of the prior art methods of dealing with the problem of back-mixing, i.e., separating a single-stage reactor into several catalyst bed zones by means of a series of screens, with the process of the present invention.

A stainless steel tube with an internal diameter of 0.75 inch containing 11, 40 × 40 mesh wire screens placed horizontally at 1 inch intervals throughout the catalyst bed was charged with 106 grams of fresh catalyst of the type used in Examples 1 and 2. The yields of phthalic anhydride obtained throughout a 31.5 hour test (Table V) were better than those obtained with the conventional single-stage reactor (Table II) but not as good as those with the two-stage reactor (Table I).

The following example in connection with Example 7 demonstrates the fact that the present inventive process is uniquely suited to the vapor phase oxidation of o-xylene to phthalic anhydride rather than naphthalene to phthalic anhydride.

EXAMPLE 6

The two-stage reactor was charged with 86 grams (43 grams each stage) of a commercial fluid bed naphthalene oxidation catalyst (4 percent by wt. $V_2O_5$, 77 percent by wt. $SiO_2$). A mixture of purified naphthalene and air was fed to the reactor for 24 hours. Extremely poor yields of phthalic anhydride were produced as shown in Table VI.

EXAMPLE 7

A fresh sample (86 grams) of the commercial naphthalene oxidation catalyst used in Example 6 was tested for 27 hours in the conventional fluid bed reactor. The yields of phthalic anhydride produced under these conditions (95–100 wt percent) as shown in Table VII are normal for this catalyst.

Table I

| Hours on Stream | Hourly Flow Rate, Grams | | | Temp. °F | | Product Yields (Grams/100g O-Xylene) | | Feed Conversion % |
|---|---|---|---|---|---|---|---|---|
| | Feed | Air | SO$_2$ | 1st Stage | 2nd Stage | Phthalic Anhydride | Maleic Anhydride | |
| 2.43 | 5.3 | 53 | 0.1 | 675 | 675 | 100.1 | 5.3 | 94.5 |
| 3.99 | 5.3 | 53 | 0.1 | 675 | 712 | 105.4 | 6.5 | 98.6 |
| 4.91 | 5.3 | 79.5 | 0.15 | 675 | 712 | 109.8 | 5.4 | 97.2 |
| 6.28 | 5.3 | 79.5 | 0.15 | 676 | 714 | 109.5 | 5.9 | 97.5 |
| 23.76 | 5.3 | 79.5 | 0.15 | 694 | 714 | 110.2 | 6.1 | 97.7 |
| 28.60 | 5.3 | 79.5 | 0.15 | 696 | 729 | 111.0 | 6.5 | 98.5 |

Table II

| Hours on Stream | Hourly Flow Rate, Grams | | | Reactor Temp. °F | Product Yields (Grams/100g O-Xylene) | | Feed Conversion % |
|---|---|---|---|---|---|---|---|
| | Feed | Air | SO$_2$ | | Phthalic Anhydride | Maleic Anhydride | |
| 3.19 | 5.3 | 53 | 0.1 | 696 | 93.0 | 5.5 | 94.1 |
| 25.44 | 5.3 | 53 | 0.1 | 696 | 93.8 | 7.3 | 91.4 |
| 26.07 | 5.3 | 53 | 0.1 | 709 | 91.7 | 7.4 | 93.4 |
| 26.39 | 5.3 | 79.5 | 0.15 | 711 | 97.6 | 6.6 | 92.9 |

Table III

| Hours on Stream | Hourly Flow Rate, Grams | | | Temp. °F | | Product Yields (Grams/100g O-Xylene) | | Feed Conversion % |
|---|---|---|---|---|---|---|---|---|
| | Feed | Air | SO$_2$ | 1st Stage | 2nd Stage | Phthalic Anhydride | Maleic Anhydride | |
| 3.05 | 5.3 | 53 | 0.1 | 660 | 714 | 99.1 | 5.1 | 97.1 |
| 22.92 | 5.3 | 53 | 0.1 | 666 | 720 | 103.9 | 5.9 | 96.2 |
| 25.82 | 5.3 | 53 | 0.1 | 675 | 714 | 104.2 | 6.5 | 96.4 |
| 46.39 | 5.3 | 53 | 0.1 | 714 | 675 | 103.4 | 6.7 | 96.1 |
| 49.90 | 5.3 | 79.5 | 0.15 | 714 | 676 | 107.4 | 6.9 | 98.0 |

Table IV

| Hours on Stream | Hourly Flow Rate, Grams | | | Reactor Temp. °F | Product Yields (Grams/100g O-Xylene) | | Feed Conversion % |
|---|---|---|---|---|---|---|---|
| | Feed | Air | SO$_2$ | | Phthalic Anhydride | Maleic Anhydride | |
| 3.63 | 5.3 | 53 | 0.1 | 694 | 92.9 | 8.9 | 93.8 |
| 21.71 | 5.3 | 53 | 0.1 | 703 | 94.2 | 6.8 | 93.2 |
| 23.41 | 5.3 | 53 | 0.1 | 712 | 89.7 | 8.1 | 93.8 |
| 24.38 | 5.3 | 53 | 0.1 | 716 | 94.1 | 7.4 | 94.2 |
| 26.03 | 5.3 | 79.5 | 0.15 | 720 | 96.1 | 8.0 | 93.1 |
| 28.40 | 5.3 | 79.5 | 0.15 | 725 | 98.5 | 8.9 | 95.9 |

Table V

| Hours on Stream | Hourly Flow Rate, Grams | | | Reactor Temp. °F | Product Yields (Grams/100g O-Xylene) | | Feed Conversion % |
|---|---|---|---|---|---|---|---|
| | Feed | Air | SO$_2$ | | Phthalic Anhydride | Maleic Anhydride | |
| 4.24 | 5.3 | 53 | 0.1 | 685 | 97.3 | 4.2 | 95.6 |
| 22.67 | 5.3 | 53 | 0.1 | 685 | 88.6 | 4.5 | 92.5 |
| 29.33 | 5.3 | 79.5 | 0.15 | 727 | 105.8 | 4.1 | 94.7 |
| 31.39 | 5.3 | 79.5 | 0.15 | 738 | 103.3 | 5.0 | 97.8 |

Table VI

| Hours on Stream | Hourly Flow Rate, Grams | | Temp. °F | | Product Yields (Grams/100g Naphthalene) | | | Feed Conversion % |
|---|---|---|---|---|---|---|---|---|
| | Feed | Air | 1st Stage | 2nd Stage | Phthalic Anhydride | Maleic Anhydride | 1,4 Naphthoquinone | |
| 4.71 | 3.4 | 37.8 | 721 | 723 | 10.8 | 3.1 | 2.5 | 92.4 |
| 21.36 | 3.4 | 37.8 | 727 | 727 | 6.3 | 4.0 | 4.5 | 92.3 |
| 23.56 | 3.4 | 37.8 | 703 | 702 | 5.4 | 3.1 | 4.6 | 87.8 |

Table VII

| Hours on Stream | Hourly Flow Rate, Grams | | Reactor Temp. °F | Product Yields (Grams/100g Naphthalene) | | | Feed Conversion % |
|---|---|---|---|---|---|---|---|
| | Feed | Air | | Phthalic Anhydride | Maleic Anhydride | 1, 4 Naphthoquinone | |
| 18.03 | 3.4 | 37.8 | 696 | 92.5 | 3.5 | <0.1 | 100 |
| 21.96 | 3.4 | 37.8 | 678 | 95.1 | 2.0 | <0.1 | 100 |
| 24.67 | 3.4 | 37.8 | 657 | 102.8 | 2.1 | <0.1 | 100 |

What is claimed is:

1. A process for improving the yield of phthalic anhydride recovered from the oxidation of o-xylene comprising carrying out the reaction at a temperature of from 600° to 750°F. and a pressure of from 1 to 75 p.s.i.g. in the presence of a $V_2O_5/TiO_2$ catalyst in a fluidized bed reactor system wherein the reactants are passed through two or more separate fluidized bed catalytic reactors in sequence.

2. The process according to claim 1 wherein the reactants are passed through the catalyst at a rate of 0.1–2.5 ft./sec.

3. The process according to claim 1 wherein the feed comprises from 0.001 to 0.5 weight percent $SO_2$ and from 4.8 to 13.5 weight percent ortho-xylene and from 84 to 95.2 weight percent air.

* * * * *